US012616082B2

(12) United States Patent
Casper et al.

(10) Patent No.: US 12,616,082 B2
(45) Date of Patent: May 5, 2026

(54) SEED PLACEMENT DEVICE

(71) Applicant: DEERE & COMPANY, MOLINE, IL (US)

(72) Inventors: Robert T. Casper, Davenport, LA (US); Elijah B. Garner, Bettendorf, IA (US); Dnyanesh Dhobale, Pune (IN); Stanley R. Borkgren, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 1018 days.

(21) Appl. No.: 17/676,579

(22) Filed: Feb. 21, 2022

(65) Prior Publication Data

US 2022/0264789 A1     Aug. 25, 2022

Related U.S. Application Data

(60) Provisional application No. 63/152,995, filed on Feb. 24, 2021.

(51) Int. Cl.
| | |
|---|---|
| *A01C 19/02* | (2006.01) |
| *A01C 5/06* | (2006.01) |
| *A01C 7/04* | (2006.01) |
| *A01C 7/10* | (2006.01) |
| *A01C 7/16* | (2006.01) |

(52) U.S. Cl.
CPC .............. *A01C 19/02* (2013.01); *A01C 5/064* (2013.01); *A01C 7/046* (2013.01); *A01C 7/102* (2013.01); *A01C 7/16* (2013.01)

(58) Field of Classification Search
CPC ......... A01C 19/02; A01C 5/064; A01C 7/046; A01C 7/102; A01C 7/16; A01C 7/0443
See application file for complete search history.

(56) References Cited

U.S. PATENT DOCUMENTS

| | | | | |
|---|---|---|---|---|
| 8,336,471 B2 * | 12/2012 | Gilstring | .............. | A01C 7/0445 |
| | | | | 111/185 |
| 8,850,995 B2 | 10/2014 | Garner et al. | | |
| 9,510,502 B2 * | 12/2016 | Garner | .................... | A01C 7/12 |
| 9,877,425 B2 * | 1/2018 | Garner | ................ | A01C 23/025 |
| 10,806,070 B2 | 10/2020 | Garner et al. | | |

(Continued)

FOREIGN PATENT DOCUMENTS

WO     WO2013049198 A1     4/2013

OTHER PUBLICATIONS

Extended European Search Report and Written Opinion issued in European Patent Application No. 22158212.5, dated Jul. 20, 2022, in 11 pages.

*Primary Examiner* — Jamie L McGowan

(57)     ABSTRACT
A seed placement device connected to a machine to transfer seed to a furrow includes a housing having a first opening through which seed is received and a second opening through which seed is discharged. An endless member positioned within the housing, and a drive member that controls movement of the endless member in cooperation with movement of the machine. The machine operates in a seeding direction at a travel speed, and the endless member discharges seed at a discharge speed and in a discharge direction. The discharge direction is approximately opposite to the seeding direction, and the discharge speed of the seed is at least 1.2 times the travel speed of the machine.

20 Claims, 8 Drawing Sheets

(56) References Cited

U.S. PATENT DOCUMENTS

| | | | |
|---|---|---|---|
| 2012/0067261 A1 | 3/2012 | Garner et al. | |
| 2014/0144357 A1* | 5/2014 | Garner | A01C 7/0445 111/170 |
| 2014/0144358 A1* | 5/2014 | Garner | A01C 7/0445 111/171 |
| 2014/0182495 A1* | 7/2014 | Wendte | A01C 7/102 111/14 |
| 2015/0237793 A1* | 8/2015 | Rans | A01C 7/20 111/177 |
| 2016/0050842 A1* | 2/2016 | Sauder | A01C 21/005 111/186 |
| 2016/0143213 A1* | 5/2016 | Kowalchuk | A01C 7/127 111/170 |
| 2017/0094894 A1* | 4/2017 | Heim | A01C 5/064 |
| 2019/0110388 A1* | 4/2019 | Gresch | A01C 7/20 |
| 2020/0000016 A1* | 1/2020 | Hubner | A01C 7/046 |
| 2020/0037492 A1* | 2/2020 | Conrad | A01C 23/028 |
| 2021/0059106 A1* | 3/2021 | Garner | A01C 7/127 |
| 2021/0185890 A1* | 6/2021 | Johnson | A01C 7/20 |
| 2021/0185893 A1* | 6/2021 | Johnson | A01C 7/04 |
| 2021/0307240 A1* | 10/2021 | Godart | A46B 5/06 |
| 2021/0307241 A1* | 10/2021 | Garner | A46B 5/06 |

* cited by examiner

SEED PLACEMENT DEVICE

INCORPORATION BY REFERENCE TO ANY PRIORITY APPLICATIONS

This application claims priority benefit of U.S. Provisional Application No. 63/152,995, filed on Feb. 24, 2021. All of the above applications are incorporated by reference herein and are to be considered a part of this specification. Any and all applications for which foreign or domestic priority claim is identified in the Application Data Sheet as filed with the present application are hereby incorporated.

BACKGROUND

The present disclosure relates to a planting unit for a seeding machine that is configured to position one or more seeds of various sizes for planting within a furrow.

SUMMARY

In one embodiment, the disclosure provides a seed placement device connected to a machine to transfer seed to a furrow. The seed placement device includes a housing having a first opening through which seed is received and a second opening through which seed is discharged. An endless member positioned within the housing, and a drive member that controls movement of the endless member in cooperation with movement of the machine. The machine operates in a seeding direction at a travel speed, and the endless member discharges seed at a discharge speed and in a discharge direction. The discharge direction is approximately opposite to the seeding direction, and the discharge speed of the seed is at least 1.2 times the travel speed of the machine.

In another embodiment the disclosure provides a seeding machine that transfers seed to a furrow. The seeding machine includes a machine that moves along a ground surface in a seeding direction at a seeding speed, and a seed placement device connected to the machine for movement along the ground surface with the machine. The seed placement device includes a housing having a first opening through which seed is received and a second opening through which seed is discharged, an endless member positioned within the housing, and a drive member that controls movement of the endless member in cooperation with movement of the machine. The endless member discharges seed in a discharge direction at a discharge speed. The discharge direction is approximately opposite to the seeding direction, and the discharge speed of the seed is at least 1.2 times the seeding speed of the machine.

In another embodiment the disclosure provides a seed placement device connected to a machine to transfer seed to a furrow. The seed placement device includes a hopper that stores and delivers seed, and a metering member having a plurality of apertures each sized to receive one or more seeds from the hopper and to dispense the one or more seeds. An endless member is positioned to receive the one or more seeds from the metering member and to discharge the one or more seeds into the furrow, and a variable speed drive member controls movement of the endless member in cooperation with movement of the machine. The machine operates in a seeding direction at a seeding speed, and the endless member discharges seed in a discharge direction at a discharge speed while the machine travels at the seeding speed.

The discharge direction is approximately opposite to the seeding direction, and the discharge speed is at least 1.2 times the seeding speed.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
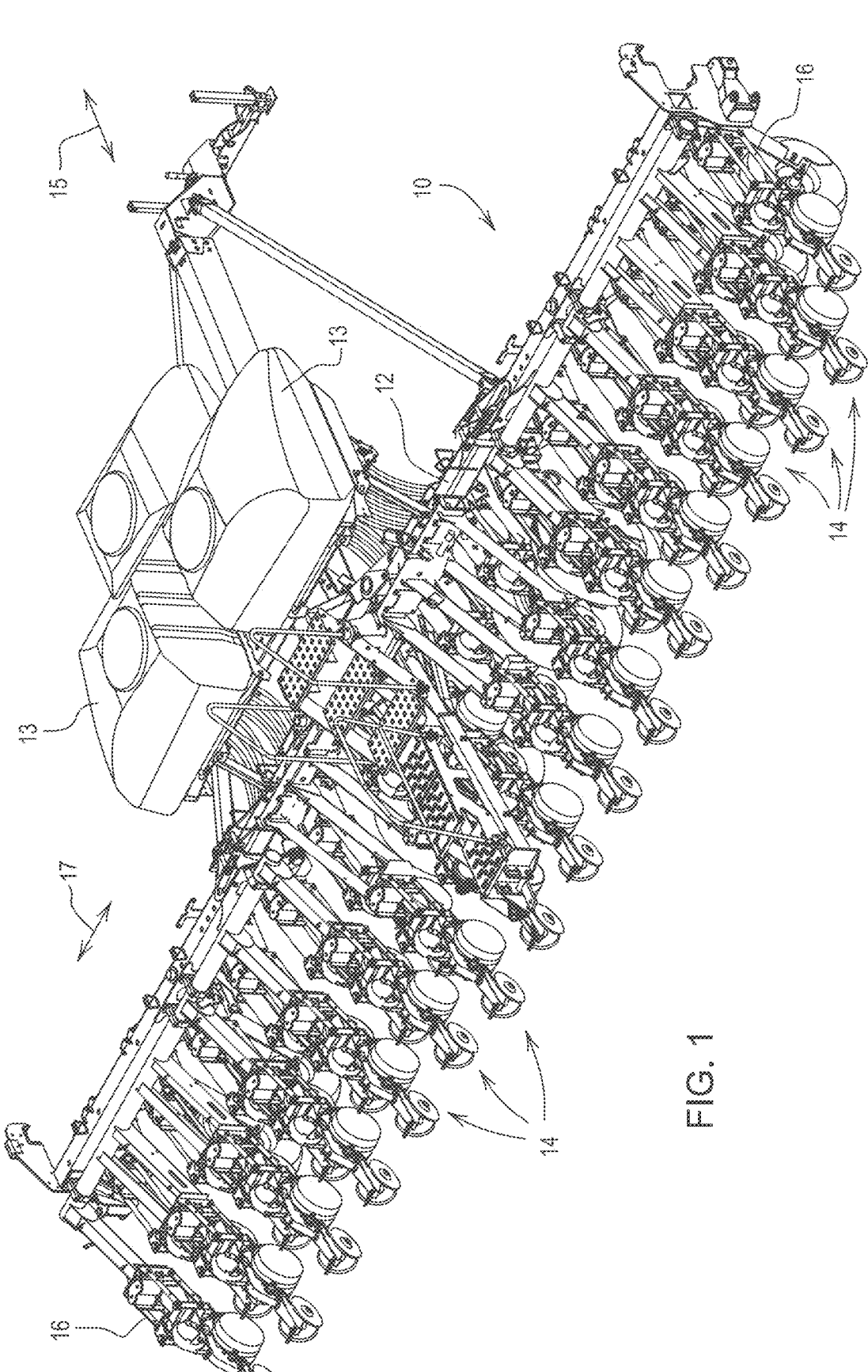
FIG. 1 is a perspective view of an agricultural planter.

An agricultural seeding machine 10 is shown in FIG. 1 as a row crop planter. The seeding machine 10 has a central frame 12, or toolbar, on which may be mounted a plurality of individual planting units 14, or row units. The seeding machine 10 has a fore-aft direction shown by arrow 15 and a transverse direction shown by arrow 17. In some embodiments, the seeding machine 10 is configured to be drawn, e.g., by a tractor or other vehicle (not shown). In other embodiments, the seeding machine 10 can be automated or self-propelled such that the seeding machine 10 is not drawn by a tractor or other vehicle.

Each planting unit 14, or row unit, may be connected to the central frame 12 by a parallel linkage 16 so that the individual planting units 14 may move up and down, e.g., to a limited degree, relative to the central frame 12. Storage tanks 13, e.g., large or centralized storage tanks, may hold seed for pneumatic delivery to a hopper, e.g., a mini-hopper, on each planting unit 14.

Figure 2:
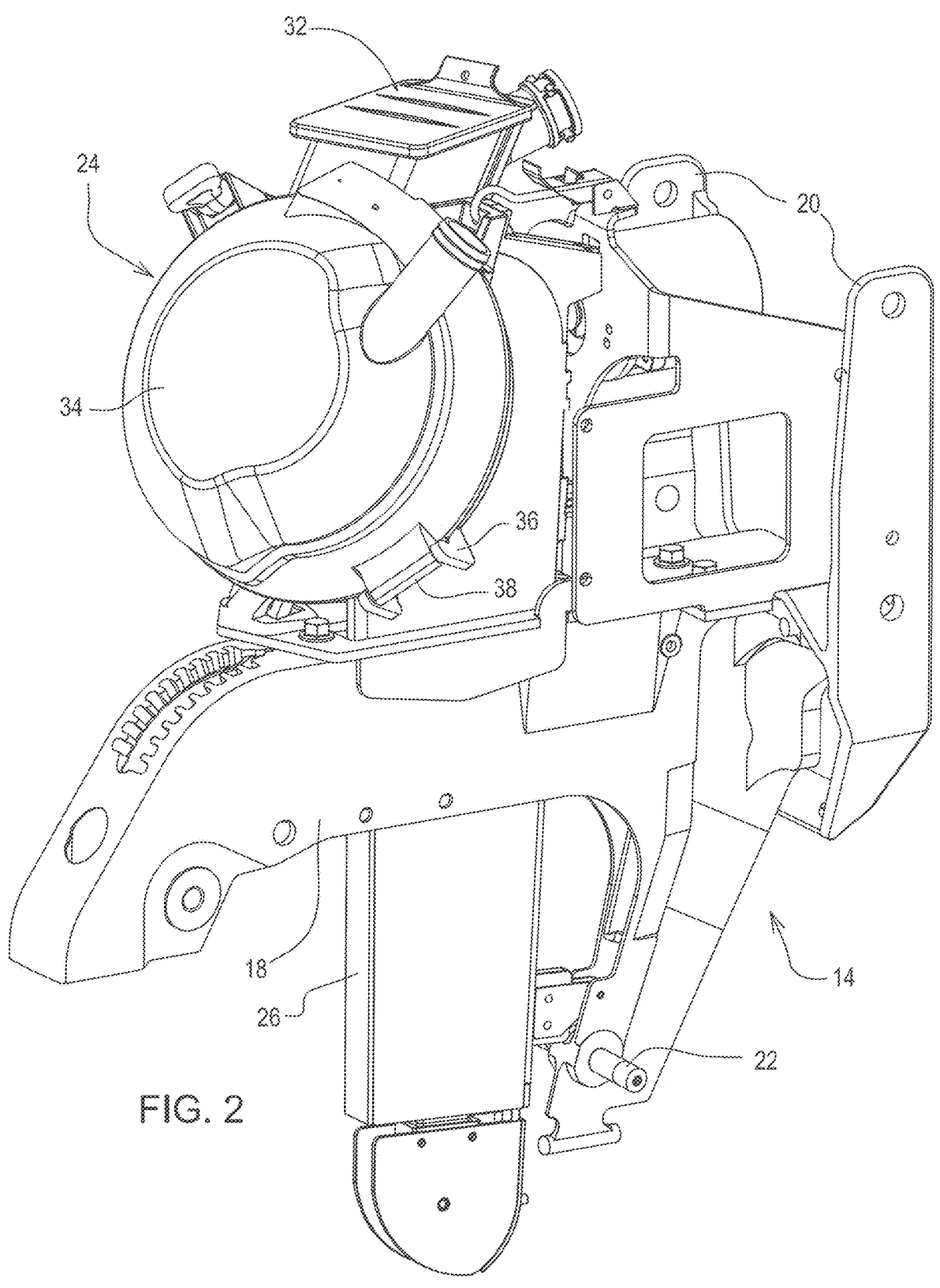
FIG. 2 is a side perspective view of a planting unit frame, seed meter and seed delivery system.

With reference to FIG. 2, each planting unit 14 has a frame member 18 to which one or more of the components of the planting unit 14 may be mounted, fixed, or coupled. The frame member 18 may include a pair of upstanding arms 20 at one end of the frame member 18, e.g., the forward end of the frame member 18, with reference to the fore-aft direction 15. The arms 20 may be connected to the rearward ends of the parallel linkage 16. Furrow opening disks (not shown) can be attached to shaft 22 to form an open furrow 70 in the soil beneath the seeding machine 10 into which seed may be deposited. In some embodiments, closing and packing wheels (see FIG. 1) are also mounted to the frame member 18 (e.g., at the rearward end of the frame member, with reference to the fore-aft direction 15). Such closing and packing wheels may facilitate closure of the furrow 70 over the deposited seed and firming of the soil in/within the furrow 70, e.g., the closed furrow. A seed meter 24 and/or a seed placement device or seed delivery system 26 may also be attached, mounted, fixed, or coupled to the frame member 18 of the planting unit 14.

Figure 3:
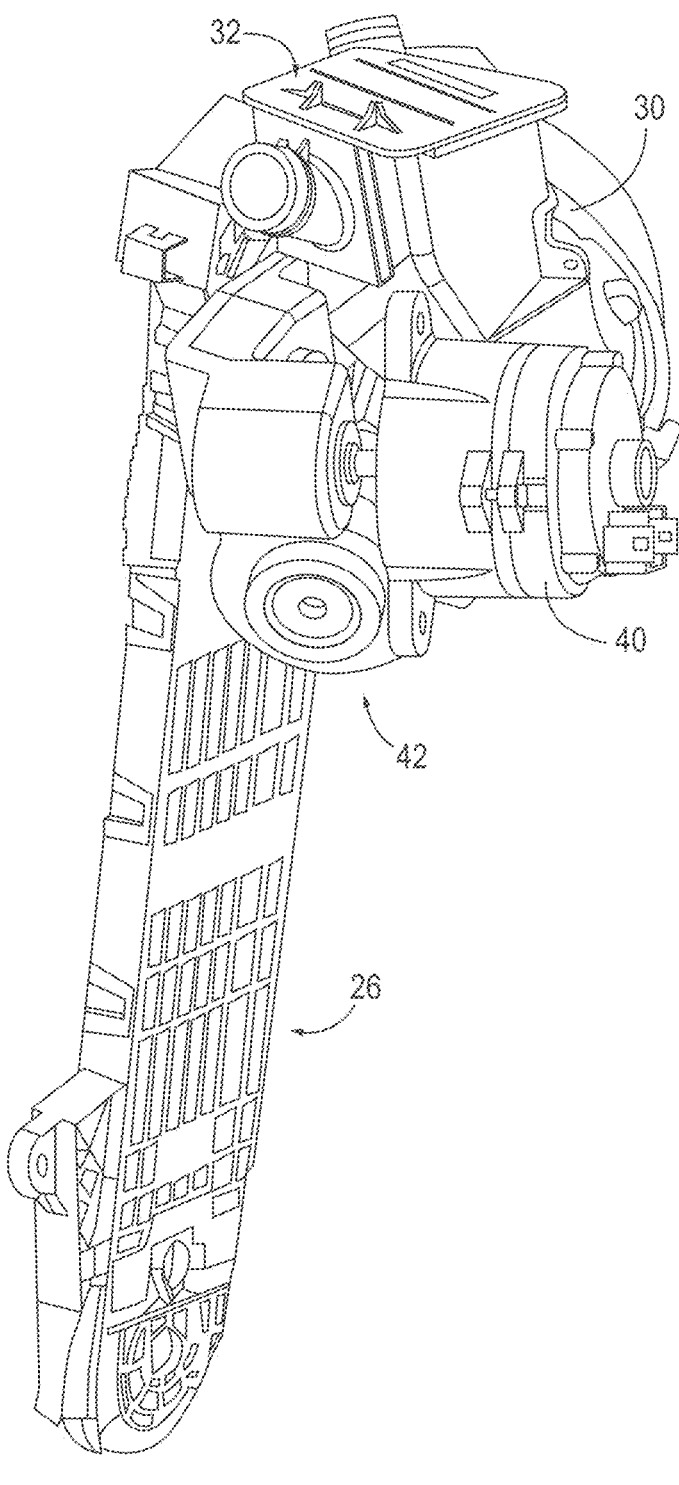
FIG. 3 is a rear perspective view of the planting unit frame, seed meter and seed delivery system.

In some embodiments, the seed meter 24 includes a housing 30, a hopper 32 and a cover 34. The housing 30 and the cover 34 may be connected to one another by complimentary hinge features (e.g., first complimentary hinge feature 36 and second complimentary hinge feature 38 on the housing and cover, respectively). With reference to FIG. 3, the housing 30 can be connected to the hopper 32 and may be configured to receive seed from the hopper 32 through a first opening and dispense the seed through a second opening. The meter 24 is described in greater detail in U.S. Pat. Nos. 8,850,995, 10,806,070 and 9,510,502, the entire contents of which are herein incorporated by reference.

The delivery system 26 may be driven by a drive member 40. The output shaft of motor or drive member 40 may be connected to the seed placement device 26 through/via a gear train 42. In some embodiments, the drive member 40 includes an electric motor. In some embodiments, the drive member 40 includes another type of motors such as hydraulic, pneumatic, etc. In some embodiments, the drive member 40 includes a mechanical drive system. In some embodiments, the drive member 40 includes a single motor. In other embodiments, the drive member 40 includes two, three, or four motors. In some embodiments, the drive member 40 includes more than four motors.

Figure 4:
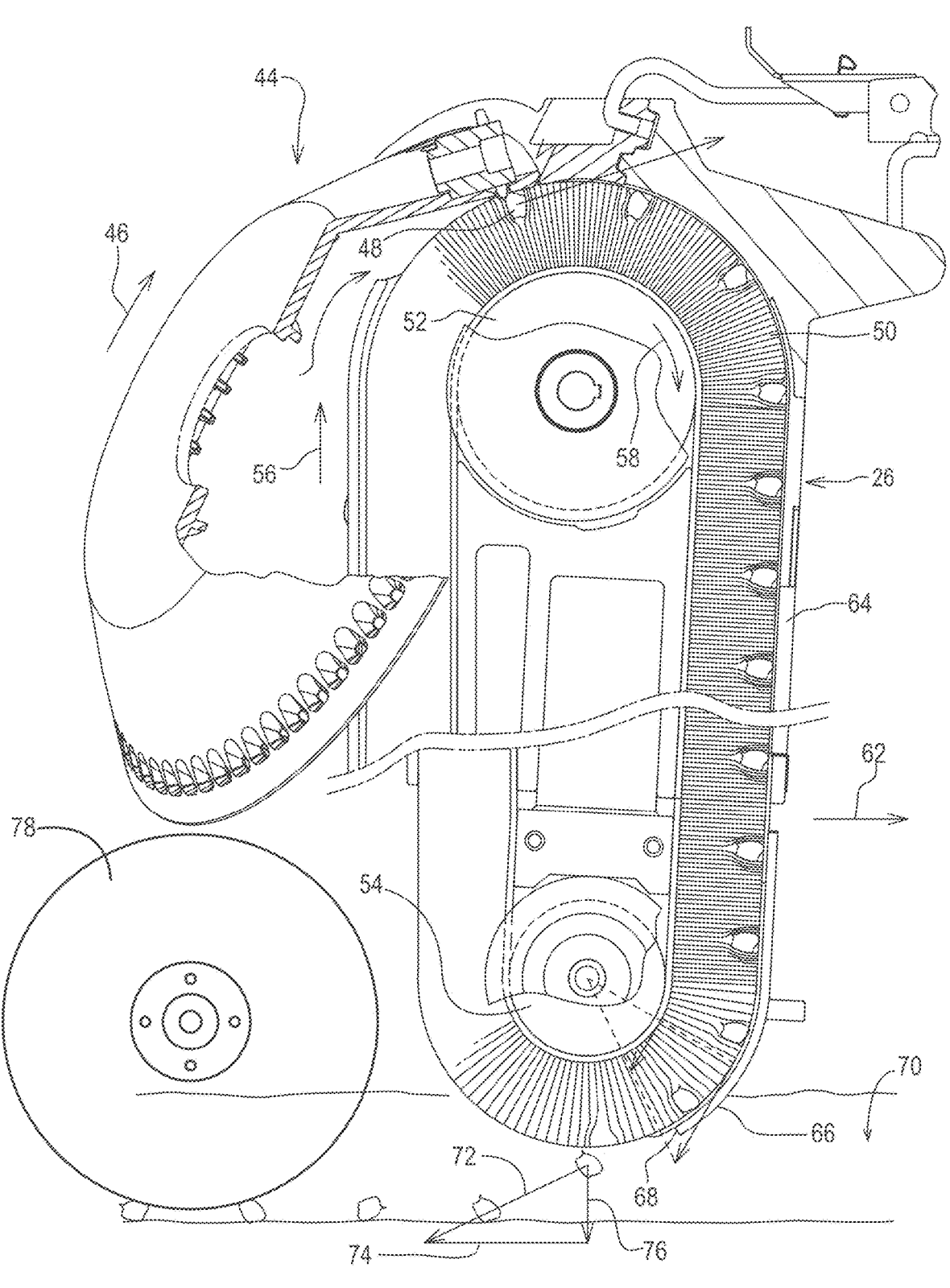
FIG. 4 is a side sectional view of a metering member and seed delivery system.

As shown in FIG. 4, a metering member 44, may be positioned within the seed meter 24 (e.g., between the housing 30 and the cover 34 of the seed meter 24). As described in U.S. Pat. No. 9,510,502, the metering member 44 can move seed(s) from a seed pool within the seed meter 24 (e.g., received into the seed pool from the hopper 32) toward the seed delivery system 26. The metering member 44 may be configured to rotate (e.g., be driven) in the metering member direction of rotation 46. As shown in FIG. 4, a seed 48 is at the release position on the metering member 44 inserted (e.g., just inserted) into the endless member 50 of the delivery system 26 (e.g., into bristles of the endless member 50). In the seed metering and delivery system shown in FIG. 4, the endless member 50 comprises a brush belt. In some embodiments, the endless member 50 is an endless member other than a brush belt. For example, the endless member 50 may comprise multiple belts, e.g., multiple (e.g., two) smooth or textured belts in an opposed configuration. In some embodiments, the endless member 50 comprises bristles, a foam pad, expanded foam pad, mesh pad, or fiber pad. In some embodiments, the endless member comprises one or more flighted belts, e.g., a rubber or polymer-based flighted belt or a chain or metal-based flighted belt. The endless member 50 can move, or rotate, or be configured to move or rotate about pulleys (e.g., first pulley 52 and second pulley 54). In some embodiments, the endless member 50 moves or rotates or is configured to move or rotate in a clockwise direction as shown by arrows 56 and 58. One or both of the first pulley 52 and the second pulley 54 may be a driven pulley and used to drive rotation of the endless member 50. In some embodiments, the first pulley 52 is a driven pulley and configured to drive rotation of the endless member 50. In some embodiments, the second pulley 54 is a driven pulley and configured to drive rotation of the endless member 50. In some embodiments, both the first pulley 52 and the second pulley 54 are driven pulleys and are configured tom together drive rotation of the endless member 50. In some embodiments, the first pulley 52 is an idler pulley. In some embodiments, the second pulley 54 is an idler pulley.

In operation, the seeding machine 10 travels at a seeding speed in a seeding direction, represented by seeding machine travel vector 62. As the seeding machine 10 travels in the seeding direction at the seeding speed, the metering member 44, within the seed meter 24, rotates, e.g., in the direction shown by arrow 46, and the endless member 50 rotates, e.g., rotates about pulleys 52 and 54, in the direction shown by arrows 56 and 58. The endless member 50 moves or conveys or carries the seed 48 along or through an endless member housing 64 and onto an exit ramp 66. In some embodiments, the exit ramp 66 is a curved exit ramp. In some embodiments the exit ramp 66 is a straight or flat exit ramp 66. The seed exits the endless member housing 64 (e.g., is discharged from the endless member housing 64) at a lower opening 68, e.g., the seed is discharged out of the lower opening 68 by the endless member 50 (due to rotation of the endless member 50 about the first pulley 52 and the second pulley 54) where it is directed or ejected into the furrow 70 with a discharge velocity having a discharge speed in a discharge direction as shown by seed discharge velocity vector 72.

In some embodiments, the discharge velocity vector horizontal component 74 of the seed discharge velocity vector 72 is in a direction opposite, e.g., substantially opposite, to the seeding machine travel vector 62. For example, as shown in FIG. 4, the seeding machine travel vector 62, representing the travel speed and travel direction of the seeding machine 10, is pointing to the right and the seed discharge velocity vector 72 is pointing generally to the left. Seed discharge velocity vector 72 of the seed 48 upon discharge from the endless member 50 includes both a discharge velocity vector horizontal component 74 and a discharge velocity vector vertical component 76. The discharge velocity vector horizontal component 74 of the seed discharge velocity vector 72 may be in a direction opposite, e.g., generally opposite, to the direction of the seeding machine travel vector 62. The vector components of the seed discharge velocity vector 72 may be changed based on the release location of the seed 48, e.g., where the lower opening 68 releases the seed.

The velocity profile of the seed 48 exiting or leaving the housing 64 can be tailored or altered by the structure of the housing curving around or extending around the lower or second pulley 54 (e.g., the relationship between the horizontal vector velocity 74 and the vertical vector component 76 may be at least partially determined by a location of the end of the curved exit ramp 66). At an extreme, if the forward wall of the housing 64 were to end immediately before or at the point where the endless member 50 begins to curve around the second pulley 54 (i.e., where the endless member 50 begins to be tangent to the second pulley 54 rather than approximately straight between the first pulley 52 and the second pulley 54), the seed 48 would be ejected in a direction parallel to the forward, leading wall of the housing 64. In that case, the discharge velocity vector vertical component 76 of the seed discharge velocity vector 72 would be far greater than the discharge velocity vector horizontal component 74 of the seed discharge velocity vector 72. Indeed, as the leading wall of the housing 64 approaches vertical (i.e., 90 degrees to the bottom of the furrow 70), the discharge velocity vector horizontal component 74 of the seed discharge velocity vector 72 will approach zero. This is, in effect, ejecting the seed 48 vertically downward.

By contrast, if the forward wall of the housing 64 were to end (i.e., stop curving or extending around the second pulley 54) on an imaginary line connecting the centers of the first pulley 52 and the second pulley 54, the seed 48 would be ejected in a direction parallel or nearly parallel to the bottom of the furrow 70. In that case, the discharge velocity vector horizontal component 74 of the seed discharge velocity vector 72 would be far greater than the discharge velocity vector vertical component 76 of the seed discharge velocity vector 72. In this situation, as the line connecting the first pulley 52 and the second pulley 54 approaches perpendicular to the furrow 70 (i.e., 90 degrees to the bottom of the furrow 70), the discharge velocity vector vertical component 76 of the seed discharge velocity vector 72 will approach zero. This is, in effect, ejecting the seed 48 horizontally rearward. Of course, even if there is no vertical component to the seed discharge velocity vector 72 imparted by the endless member 50 and the housing 64 on the seed 48, the seed 48 will ultimately or eventually fall to the ground under the influence of gravity.

Between the point where the forward wall of the housing 64 curves around the first pulley 52, from the point where it just begins to curve around the first pulley 52 (e.g., perpendicular to the furrow 70, or the point where a seed 48 would be ejected substantially downward) to the point where the forward wall of the housing 64 curves to perpendicular to the line connecting the second pulley 54 and the first pulley 52 (e.g., parallel to the furrow 70, or the point where a seed 48 would be ejected substantially horizontally) the ratio between the discharge velocity vector horizontal component 74 and the discharge velocity vector vertical component 76 changes. The further the forward wall of the housing 64 curves around the first pulley 52, the more the discharge velocity vector horizontal component 74 will dominate the ratio. Taking into account discharge speed, the discharge velocity vector horizontal component 74, discharge velocity vector vertical component 76, and the effects of gravity, the location where a seed 48 will strike the bottom of the furrow 70 may be known and/or tuned.

The speed of the seed discharge velocity vector 72 can have an effect, e.g., a significant effect, on the location where a seed 48 will strike the bottom of the furrow 70. For example, as the speed of the seed discharge velocity vector 72 approaches zero, the effects of gravity will overwhelm the seed discharge velocity vector 72, regardless of the discharge direction of the seed 48. In much the same way, as the speed of the seed discharge velocity vector 72 increases, the effect of gravity will decrease. At some point, when the speed of the seed discharge velocity vector 72 is sufficiently high, the effect of gravity is negligible compared to the seed discharge velocity vector 72. Therefore, when the speed of the seed discharge velocity vector 72 is sufficiently high, the approximate location where the seed 48 will strike the ground may be estimated using only the discharge velocity vector horizontal component 74 and the discharge velocity vector vertical component 76 of the seed discharge velocity vector 72.

Where the discharge velocity vector horizontal component 74 of the seed discharge velocity vector 72 is less than the seeding machine travel vector 62, the seed 48 will have a net forward horizontal speed upon discharge (in addition to the discharge velocity vector vertical component 76 of the seed discharge velocity vector 72).

Where the discharge velocity vector horizontal component 74 of the seed discharge velocity vector 72 is equal to the seeding machine travel vector 62, the seed 48 will have a net zero horizontal speed upon discharge and will therefore have only a vertical speed (i.e., the discharge velocity vector vertical component 76 of the seed discharge velocity vector 72, as the horizontal velocities cancel each other out leaving only the imparted vertical velocity). This may be referred to as speed matched or speed matching. A system in which the discharge velocity vector horizontal component 74 of the seed discharge velocity vector 72 can be selectively matched to a plurality of different seeding machine travel vectors 62 (i.e., matched to various forward direction travel speeds) may be referred to as a speed matching system or a speed matched or speed matching system.

Where the discharge velocity vector horizontal component 74 of the seed discharge velocity vector 72 is greater than the seeding machine travel vector 62, the seed 48 will have a net rearward horizontal speed upon discharge (in addition to the discharge velocity vector vertical component 76 of the seed discharge velocity vector 72). As the magnitude of the seed discharge velocity vector 72 increases significantly over the magnitude of the seeding machine travel vector 62, the observable effect of the seeding machine travel vector 62 on discharge of the seed 48 becomes lesser until, at some point (as the magnitude of the seed discharge velocity vector 72 increases) the effect of the seeding machine travel vector 62 on discharge of the seed 48 becomes negligible, being dominated by the seed discharge velocity vector 72. A system in which the discharge velocity vector horizontal component 74 of the seed discharge velocity vector 72 is greater than the seeding machine travel vector 62, e.g., greater than a plurality of different seeding machine travel vectors 62, may be referred to as an overspeeding system or an oversped system.

In some embodiments, e.g., in some or all embodiments of an oversped system, the magnitude of the seed discharge velocity vector 72 and/or the magnitude of the discharge velocity vector horizontal component 74 is greater than the magnitude of the seeding machine travel vector 62 during operation, e.g., during a seeding operation.

In some embodiments, the discharge velocity vector horizontal component 74 of the seed discharge velocity vector 72 is at least partially responsive to the seeding machine travel vector 62. For example, the magnitude of the discharge velocity vector horizontal component 74 may be greater than 100% of the magnitude of the seeding machine travel vector 62. In some embodiments, the magnitude of the discharge velocity vector horizontal component 74 may be greater than about 102% of the seeding machine travel vector 62, greater than about 104% of the seeding machine travel vector 62, greater than about 106% of the seeding machine travel vector 62, greater than about 108% of the seeding machine travel vector 62, greater than about 110% of the seeding machine travel vector 62, greater than about 112% of the seeding machine travel vector 62, greater than about 114% of the seeding machine travel vector 62, greater than about 116% of the seeding machine travel vector 62, greater than about 118% of the seeding machine travel vector 62, greater than about 120% of the seeding machine travel vector 62, greater than about 125% of the seeding machine travel vector 62, greater than about 130% of the seeding machine travel vector 62, greater than about 135% of the seeding machine travel vector 62, greater than about 140% of the seeding machine travel vector 62, greater than about 145% of the seeding machine travel vector 62, greater than about 150% of the seeding machine travel vector 62, greater than about 160% of the seeding machine travel vector 62, greater than about 170% of the seeding machine travel vector 62, greater than about 180% of the seeding machine travel vector 62, greater than about 190% of the seeding machine travel vector 62, or greater than about 200% of the seeding machine travel vector 62. In some embodiments, the magnitude of the discharge velocity vector horizontal component 74 of the seed discharge velocity vector 72 may be significantly oversped by comparison to the magnitude of the seeding machine travel vector 62. For example, the magnitude of the discharge velocity vector horizontal component 74 may be greater than about 225% of the seeding machine travel vector 62, greater than about 250% of the seeding machine travel vector 62, greater than about 275% of the seeding machine travel vector 62, greater than about 300% of the seeding machine travel vector 62, greater than about 325% of the seeding machine travel vector 62, greater than about 350% of the seeding machine travel vector 62, greater than about 375% of the seeding machine travel vector 62, greater than about 400% of the seeding machine travel vector 62, greater than about 425% of the seeding machine travel vector 62, greater than about 450 of the seeding machine travel vector 62, greater than about 475% of the seeding machine travel vector 62, greater than about 500% of the seeding machine travel vector 62, or any other overspeeding ratio, i.e., ratio of magnitude of the discharge velocity vector horizontal component 74 to magnitude of the seeding machine travel vector 62 greater than one, that advantageously facilitates seed discharge and/or placement within the furrow 70.

In some embodiments, at least one of the magnitude of the discharge velocity vector horizontal component 74 of the seed discharge velocity vector 72 and the magnitude of the seed discharge velocity is greater than the magnitude of the seeding machine travel vector 62 by a factor of at least 1.5, at least 2, at least 2.5, at least 3, at least 3.5, at least 4, at least 4.5, at least 5, at least 5.5, at least 6, at least 6.5, at least 7, at least 7.5, at least 8, at least 8.5, at least 9, at least 9.5, at least 10, or. any other factor greater than one that advantageously facilitates seed discharge and/or placement within the furrow 70.

In some embodiments, the seed discharge velocity vector 72 is at least partially and/or directly responsive to the seeding machine travel vector 62. For example, the magnitude of the seed discharge velocity vector 72 may be greater than 100% of the magnitude of the seeding machine travel vector 62. In some embodiments, the seed discharge velocity vector 72 is greater than or about 102% of the seeding machine travel vector 62, greater than or about 104% of the seeding machine travel vector 62, greater than or about 106% of the seeding machine travel vector 62, greater than or about 108% of the seeding machine travel vector 62, or greater than or about 110% of the seeding machine travel vector 62. In some embodiments, the relationship or ratio between the seed discharge velocity vector 72 and the seeding machine travel vector 62 is about 2 (i.e., the seed discharge velocity vector 72 is about 2 times the seeding machine travel vector 62), about 3, about 4, about 5, about 6, about 7, about 8, about 9, about 10, about 11, about 12, about 13, about 14, about 15, about 16, about 17, about 18, about 19, or about 20. In some embodiments, the relationship or ratio between the seed discharge velocity vector 72 and the seeding machine travel vector 62 is between about 2-25, about 2-23, about 2-21, about 2.5-20, about 3-18, about 3.5-16, about 4-14, about 4.5-12, about 5-10, about 5.5-8, or about 6-7.

Ejecting a seed 48 based on the seed discharge velocity vector 72 (as opposed to the discharge velocity vector horizontal component 74 of the seed discharge velocity vector 72) may advantageously remove a calculation step. For example, a seed 48 may be easily ejected at a specific magnitude of seed discharge velocity vector 72, with a relationship between the seeding machine travel vector 62. Of course, the magnitude of the discharge velocity vector horizontal component 74 of the seed discharge velocity vector 72 may be calculated based on the angle of discharge. However, if speed matching is not desired or if overspeeding is desired, it may be less computationally complex to rely directly on the seed discharge velocity vector 72 rather than the discharge velocity vector horizontal component 74 of the seed discharge velocity vector 72. When speed matching is not desire or if overspeeding is desired, the seed discharge velocity vector 72 may be more relevant than the discharge velocity vector horizontal component 74 of the seed discharge velocity vector 72. In such cases, one or more calculations may be rendered unnecessary. However, it will be understood that each seed discharge velocity vector 72 has a discharge velocity vector horizontal component 74 and that any disclosure herein of any discharge velocity vector horizontal component 74 may be related to its corresponding seed discharge velocity vector 72 and any disclosure herein of any seed discharge velocity vector 72 may be related to its corresponding discharge velocity vector horizontal component 74.

In some embodiments, the magnitude of the discharge velocity vector horizontal component 74 of the seed discharge velocity vector 72 is maintained within a set overspeeding window, having an upper overspeeding threshold and a lower overspeeding threshold. As discussed herein, overspeeding occurs when the ratio of the magnitude of the discharge velocity vector horizontal component 74 to the magnitude of the seeding machine travel vector 62 is greater than one. Therefore, the lowest threshold that is still overspeeding is a ratio of greater than 1. In some embodiments, the lower threshold for overspeeding ratio (i.e., magnitude of the discharge velocity vector horizontal component 74 to magnitude of the seeding machine travel vector 62), is about 1.05, about 1.1, about 1.15, about 1.2, about 1.25, about 1.3, about 1.35, about 1.4, about 1.45, about 1.5, about 1.55, about 1.6, about 1.65, about 1.7, about 1.75, about 1.8, about 1.85, about 1.9, about 1.95, about 2, or any other lower threshold that advantageously facilitates seed discharge and/or placement. In some embodiments, the upper threshold for overspeeding ratio (i.e., magnitude of the discharge velocity vector horizontal component 74 to magnitude of the seeding machine travel vector 62), is about 5, about 4.5, about 4, about 3.8, about 3.6, about 3.4, about 3.2, about 3, about 2.9, about 2.8, about 2.7, about 2.6, about 2.5, about 2.4, about 2.3, about 2.2, about 2.1, about 2, about 1.95, about 1.9, about 1.85, about 1.8, about 1.75, about 1.7, about 1.65, about 1.6, about 1.55, about 1.5, about 1.45, about 1.4, about 1.35, about 1.3, about 1.25, about 1.2, about 1.15, about 1.1, or about 1.05, or any other upper threshold that advantageously facilitates seed discharge and/or placement. In some embodiments, any lower threshold for overspeeding ratio disclosed herein may be used with any upper threshold for overspeeding ratio disclosed herein that is greater than itself. In some embodiments, it is desirable to minimize the size of the threshold window, i.e., it is desirable to use a lower threshold and upper threshold for overspeeding ratio that are as close to each other as possible.

In some embodiments, the discharge velocity vector horizontal component 74 of the seed discharge velocity vector 72 is at least partially responsive to an operator input fastest-intended seeding speed. For example, an operator may inform the system that he or she intends to plant no faster than a set speed, such as 8 mph. In embodiments where the operator inputs an intended fastest operating speed, the system may key the overspeeding (i.e., the relationship between the magnitude of the discharge velocity vector horizontal component 74 of the seed discharge velocity vector 72 and the planting speed) to the intended fastest operating speed in the same way it may be responsive to the seeding machine travel vector 62, as discussed elsewhere herein. For example, when the operator indicates an intended fastest operating speed of 8 mph, the magnitude of the discharge velocity vector horizontal component 74 of the seed discharge velocity vector 72 may be at least 110% of the intended fastest operating speed of 8 mph, i.e., 8.8 mph. Of course, in a system where overspeeding is responsive to an operated input intended fastest operating speed, the system may fail to overspeed if the operator exceeds, e.g., significantly exceeds, the input intended fastest operating speed. Therefore, in such embodiments, it may be desirable to use a large/high ratio of the magnitude of the discharge velocity vector horizontal component 74 of the seed discharge velocity vector 72 to the operator input fastest operating speed, to give some margin of error for the operator. For example, in some embodiments of an oversped system in which the magnitude of the seed discharge velocity vector 72 and/or the magnitude of the discharge velocity vector horizontal component 74 is responsive to an intended fastest operating speed, the ratio (e.g., the ratio of the magnitude of the discharge velocity vector horizontal component 74 to the intended fastest operating speed) may be greater than about 1.5, greater than about 2, or greater than about 2.5. But, as disclosed herein any of the ranges, windows, or ratios, etc. disclosed with respect to the ratio of discharge velocity vector horizontal component 74 to seeding machine travel vector 62 may also be used in the ratio of discharge velocity vector horizontal component 74 to intended fastest operating speed.

In some embodiments, the discharge velocity vector horizontal component 74 of the seed discharge velocity vector 72 is not responsive, or is agnostic, to the seeding machine travel vector 62. For example, the magnitude of the discharge velocity vector horizontal component 74 of the seed discharge velocity vector 72 may be set at a constant value that is sufficiently higher than the likely range of planting speeds, e.g., seeding machine travel vectors 62 as to appropriately maintain overspeeding. In some embodiments, in which the likely range of planting speeds is about 4-7 mph, the magnitude of the discharge velocity vector horizontal component 74 of the seed discharge velocity vector 72 is greater than or about 8 mph, greater than or about 8.5 mph, greater than or about 9 mph, greater than or about 9.5 mph, greater than or about 10 mph, greater than or about 10.5 mph, greater than or about 11 mph, greater than or about 11.5 mph, or greater than or about 12 mph. In some embodiments, in which the likely range of planting speeds is about 8-12 mph, the magnitude of the discharge velocity vector horizontal component 74 of the seed discharge velocity vector 72 is greater than or about 12 mph, greater than or about 12.5 mph, greater than or about 13 mph, greater than or about 13.5 mph, greater than or about 14 mph, greater than or about 14.5 mph, greater than or about 15 mph, greater than or about 15.5 mph, greater than or about 16 mph, greater than or about 16.5 mph, greater than or about 17 mph, greater than or about 17.5 mph, greater than or about 18 mph, greater than or about 18.5 mph, greater than or about 19 mph greater than or about 19.5 mph, or greater than or about 20 mph. In some embodiments, in which the likely range of planting speeds is greater than about 12 mph, the magnitude of the discharge velocity vector horizontal component 74 of the seed discharge velocity vector 72 is greater than or about 13 mph, greater than or about 14 mph, greater than or about 15 mph, greater than or about 16 mph, greater than or about 17 mph, greater than or about 18 mph, greater than or about 19 mph, greater than or about 20 mph, greater than or about 21 mph, greater than or about 22 mph, greater than or about 23 mph, greater than or about 24 mph, greater than or about 25 mph, greater than or about 26 mph, greater than or about 27 mph greater than or about 28 mph, greater than or about 29 mph, greater than or about 30 mph, greater than or about 32 mph, greater than or about 34 mph, greater than or about 34 mph, greater than or about 36 mph, greater than or about 38 mph, or greater than or about 40 mph. In some embodiments, the discharge velocity vector horizontal component 74 of the seed discharge velocity vector 72 is entirely decoupled from the seeding machine travel vector 62. In such embodiments, the magnitude of the discharge velocity vector horizontal component 74 of the seed discharge velocity vector 72 may be a fixed value that may be selected to maintain overspeeding in some, most, or all operational conditions. e.g., maintain overspeeding for some, most or all seeding machine travel vectors 62. For example, the magnitude of the discharge velocity vector horizontal component 74 may be greater than or about 6 mph, greater than or about 6.5 mph, greater than or about 7 mph, greater than or about 7.5 mph, greater than or about 8 mph, greater than or about 8.5 mph, greater than or about 9 mph, greater than or about 9.5 mph, greater than or about 10 mph, greater than or about 11 mph, greater than or about 12 mph, greater than or about 13 mph, greater than or about 14 mph, greater than or about 15 mph, greater than or about 16 mph, greater than or about 17 mph, greater than or about 18 mph, greater than or about 19 mph, greater than or about 20 mph, greater than or about 22 mph, greater than or about 24 mph, greater than or about 26 mph, greater than or about 28 mph, or greater than or about 30 mph.

As discussed elsewhere herein, the angle at which the seed 48 is discharged from the housing 64 (i.e., with respect to the bottom of the furrow 70) may be changed or tuned based on a number of factors, including, notably, the where the curved portion of the forward wall of the housing 64 terminates (e.g., where the curved portion of the forward wall of the housing 64 terminates as it curves or extends around the second pulley 54). Seed 48 discharge may beat least partially described or defined by the angle at which it is released, discharged, or ejected from the housing 64, with respect to the bottom of the 70. In some embodiments, the angle of discharge is greater than or about 10°, greater than or about 150 greater than or about 20°, greater than or about 25°, greater than or about 30°, greater than or about 35°, greater than or about 40°, greater than or about 45°, greater than or about 550, greater than or about 60°, greater than or about 65°, greater than or about 70°, or greater than or about 75°. In some embodiments, the angle of discharge is between about 24-66°, between about 26-64°, between about 28-62°, between about 30-60°, between about 32-58°, between about 34-56°, between about 36-54°, between about 38-52°, between about 40-50°, between about 42-48°, or between about 44-46°. In some embodiments, the angle of discharge is about 20°, about 22°, about 24', about 26°, about 28°, about 30°, about 32°, about 34°, about 36°, about 37°, about 38°, about 39°, about 40°, about 41°, about 42°, about 43°, about 44°, about 45°, about 46°, about 470, about 48°, about 49°, about 50° about 51°, about 52°, about 53°, about 54°, about 56°, about 58°, about 60°, about 62°, about 64°, about 66°, about 68°, about 70°, or any other angle of discharge that advantageously facilitates seed discharge, placement and/or retention (e.g., in combination with a press wheel 78, as disclosed herein).

Alternatively, seed 48 discharge may be at least partially described or defined by the ratio between the discharge velocity vector horizontal component 74 and the discharge velocity vector vertical component 76 of the seed discharge velocity vector 72. In some embodiments, the relationship or ratio between the discharge velocity vector horizontal component 74 and the discharge velocity vector vertical component 76 is about 1.5. In some embodiments, the magnitude of the discharge velocity vector horizontal component 74 is greater than the magnitude of the discharge velocity vector vertical component 76. In other embodiments, the magnitude of the discharge velocity vector horizontal component 74 is equal to the magnitude of the discharge velocity vector vertical component 76. In still other embodiments, the magnitude of the discharge velocity vector horizontal component 74 is less than the magnitude of the discharge velocity vector vertical component 76. In some embodiments, the relationship or ratio between the discharge velocity vector horizontal component 74 and the discharge velocity vector vertical component 76 of the seed discharge velocity vector 72 is about 0.1, about 0.2, about 0.3, about 0.4, about 0.5, about 0.6, about 0.7, about 0.8, about 0.9, about 1, 1.1, about 1.2, about 1.3, about 1.4, about 1.5, about 1.6, about 1.7, about 1.8, about 1.9, about 2, about 2.1, about 2.2, about 2.3, about 2.4, about 2.5, about 2.6, about 2.7, about 2.8, about 2.9, about 3, about 3.1, about 3.2, about 3.3, about 3.4, about 3.5, about 3.6, about 3.7, about 3.8, about 3.9, about 4, about 4.2, about 4.4, about 4.6, about 4.8, about 5, about 5.5, about 6, or any other ratio or relationship that advantageously facilitates seed discharge, placement and/or retention (e.g., in combination with a press wheel 78, as disclosed herein).

Alternatively, seed 48 discharge may be at least partially described or defined by the horizontal distance the seed travels between release and landing in the furrow 70 (at least for the first time or point of first contact, discounting bounce and/or roll). In some embodiments, the horizontal distance the seed travels between release and landing in the furrow 70 (i.e., the distance between the line connecting the center of the first pulley 52 and the center of the second pulley 54 and where the seed 48 contacts the bottom of the furrow 70) (or the distance between the line connecting where the seed 48 contact the bottom of the furrow 70 and a line perpendicularly connecting the bottom of the furrow 70 with the center of the second pulley 54) is about 24 inches, about 23 inches, about 22 inches, about 21 inches, about 20 inches, about 19 inches, about 18 inches, about 17 inches, about 16 inches, about 15 inches, about 14 inches, about 13 inches, about 12 inches, about 11 inches, about 10 inches, about 9 inches, about 8 inches, about 7 inches, about 6 inches, about 5 inches, about 4 inches, about 3 inches, or about 2 inches.

When the discharge speed 72 is greater than the speed of travel 62, lighter weight seeds, such as wheat, sorghum and canola, can be released from the endless member 50 into the furrow 70 more consistently than would be possible if the speed of the seed discharge velocity vector 72 were lower (e.g., if the speed of the seed discharge velocity vector 72 matched the speed of the seeding machine travel vector 62).

Some embodiments of the seeding systems disclosed herein include a seed capture or retention device, such as a press wheel 78. In some embodiments, a press wheel 78 may be used to capture or hold seeds 48 ejected or discharged from the endless member 50 within the furrow 70. In some embodiments, a press wheel 78 or other capturing device such as a seed firmer is not included and seeds 48 are ejected or discharged from the endless member 50 directly into the furrow 70. As shown in FIG. 4, a packing wheel or press wheel 78 may be positioned rearward of the delivery system 26 in the direction of travel 62. The press wheel 78 engages the seeds 48 in the furrow 70 and presses the seeds 48 into the soil in the furrow 70. After the seeds 48 have been dispensed into the furrow 70, closing and packing wheels (see FIG. 1) are utilized to cover the seeds with soil and pack the soil. The seed delivery system 26 may advantageously eject or discharge seeds 48 in the point where the press wheel 78 first contacts the soil of the furrow 70 (e.g., the press wheel 78 to soil contact point). In this way, the seeds, particularly when overspeed, might be pinched or held by the press wheel 78, between the press wheel 78 and the bottom of the furrow 70. In such cases, the press wheel 78 might prevent or minimize bounce and roll of the seed 48. In particular, the press wheel 78 might prevent or minimize bounce and roll by pinching the seeds between the outer surface of the press wheel 78 and the soil of the bottom furrow 70. While a press wheel 78 that rotates about a press wheel axis (not shown) is disclosed herein, other capturing devices may be used. For example, non-rotating or dragging seed-capture devices may be used to restrain the seed 48, including but not limited to seed firmers, seed tabs, tines, or shanks.

In some embodiments, the vertical axis of the press wheel, e.g., a vertical line connecting the center of the press wheel 78 (or axis of rotation of the press wheel 78) and the bottom of the furrow 70, is separated from the vertical axis of the second pulley 54, e.g., a vertical line connecting the center of the second pulley 54 (or axis of rotation of the second pulley 54) and the bottom of the furrow 70, by a press wheel distance. In some embodiments, the press wheel distance is less than about or about 36 inches, less than or about cover 34 inches, less than or about 32 inches, less than or about 30 inches, less than or about 28 inches, less than or about 26 inches, less than or about 24 inches, less than or about 23 inches, less than or about 22 inches, less than or about 21 inches, less than or about 20 inches, less than or about 19 inches, less than or about 18 inches, less than or about 17 inches, less than or about 16 inches, less than or about 15 inches, less than or about 14 inches, less than or about 13 inches, less than or about 12 inches, less than or about 11 inches, less than or about 10 inches, less than or about 9 inches, less than or about 8 inches, less than or about 7 inches, less than or about 6 inches, or any other press wheel distance that advantageously facilitate trapping and holding of the seed within the furrow, minimizing bounce and roll of the seed within the furrow.

In some embodiments, the press wheel distance is defined by one or more parameters of the press wheel 78. For example, the press wheel distance may be represented as a multiple of a diameter of the press wheel 78. In some embodiments, the press wheel distance has a relationship to the diameter of the press wheel 78 that is less than or about 5, less than or about 4.8, less than or about 4.6, less than or about 4.4, less than or about 4.2, less than or about 4, less than or about 3.8, less than or about 3.6, less than or about 3.4, less than or about 3.2, less than or about 3, less than or about 2.8, less than or about 2.6, less than or about 2.4, less than or about 2.2, less than or about 2, less than or about 1.8, less than or about 1.6, less than or about 1.4, less than or about 1.2, less than or about 1, or any other press wheel distance that advantageously facilitate trapping and holding of the seed within the furrow, minimizing bounce and roll of the seed within the furrow.

In some embodiments, the press wheel 78 has a diameter of about 8 inches. In other embodiments, the press wheel 78 has a diameter other than 8 inches. For example, the press wheel 78 may have a diameter of about 20 inches, about 19 inches, about 18 inches, about 17 inches, about 16 inches, about 15 inches, about 14 inches, about 13 inches, about 12 inches, about 11.5 inches, about 11 inches, about 10.5 inches, about 10 inches, about 9.5 inches, about 9 inches, about 8.5 inches, about 7.5 inches, about 7 inches, about 6.5 inches about 6 inches, about 5.5 inches, or about 5 inches. The press wheel 78 may have a press wheel width having a dimension that is approximately the same as dimension of the bottom of the furrow. For example, the press wheel width may be approximately the same as or just slightly larger than the width of the bottom of the furrow 70. In other examples, the press wheel width may be just slightly smaller than the width of the bottom of the furrow 70.

In some embodiments, the location where the seed 48 contacts the ground or the bottom or the furrow 70 is substantially at the point where the press wheel 78 first contacts the soil of the furrow 70. In such embodiments, the press wheel 78 might be advantageously configured to pinch or trap the seed upon contact with the bottom of the furrow 70, thereby minimizing bounce and roll of the seed within the trench or furrow. In effect, particularly when overspeeding, the seed delivery system 26 might discharge the seed quickly and/or forcefully into the furrow and directly into the small space between the edge of the press wheel 78 and the bottom of the furrow 70. In this way, the seed delivery system 26 can eject seeds, e.g., eject seeds forcefully into the furrow 70, without significant risk of those seeds bouncing out of the furrow onto the nearby soil surface.

Figure 5:
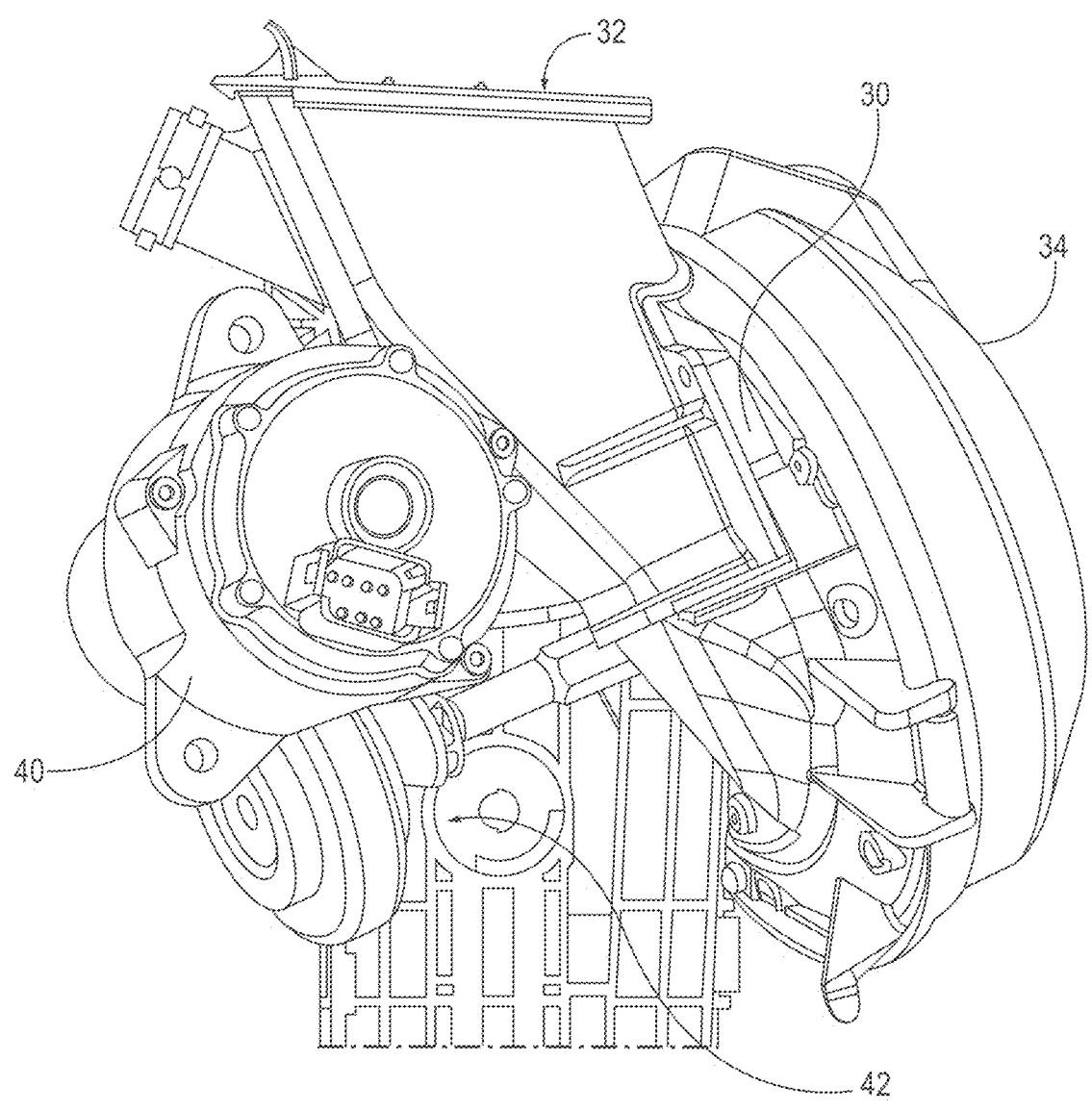
FIG. 5 is a close-up perspective view of a portion of the planting unit frame, seed meter and seed delivery system.

With reference to FIG. 5, the housing 30, the hopper 32, the cover 34, the drive member 40, and the gear train 42 are illustrated. As discussed elsewhere herein, the hopper 32 can be positioned or configured to receive seeds from the large storage tanks 13 and dispense seeds into the housing 30.

Figure 6:
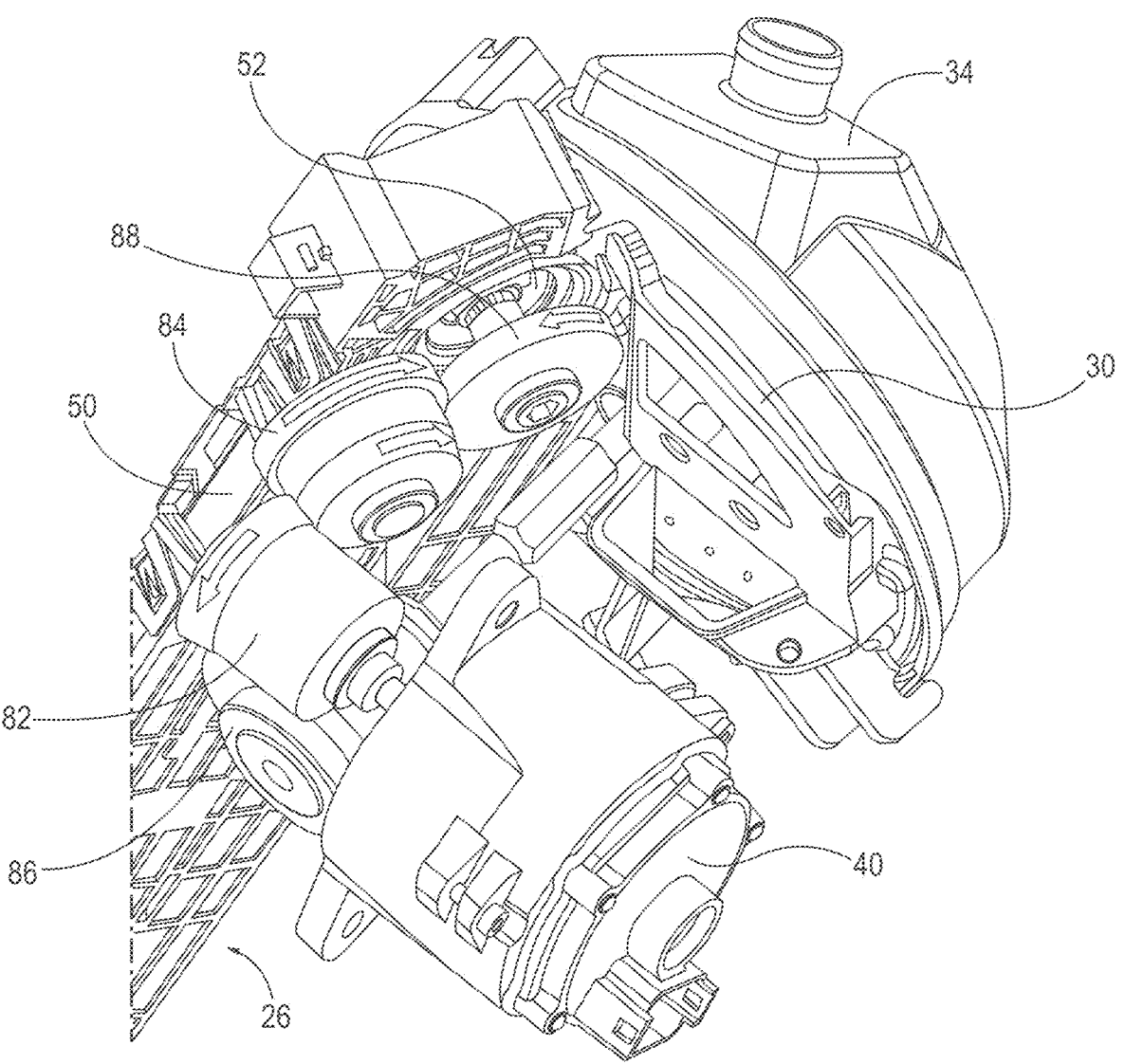
FIG. 6 is a close-up top perspective view of a portion of the planting unit frame, seed meter and seed delivery system with parts removed for clarity.
Figure 7:
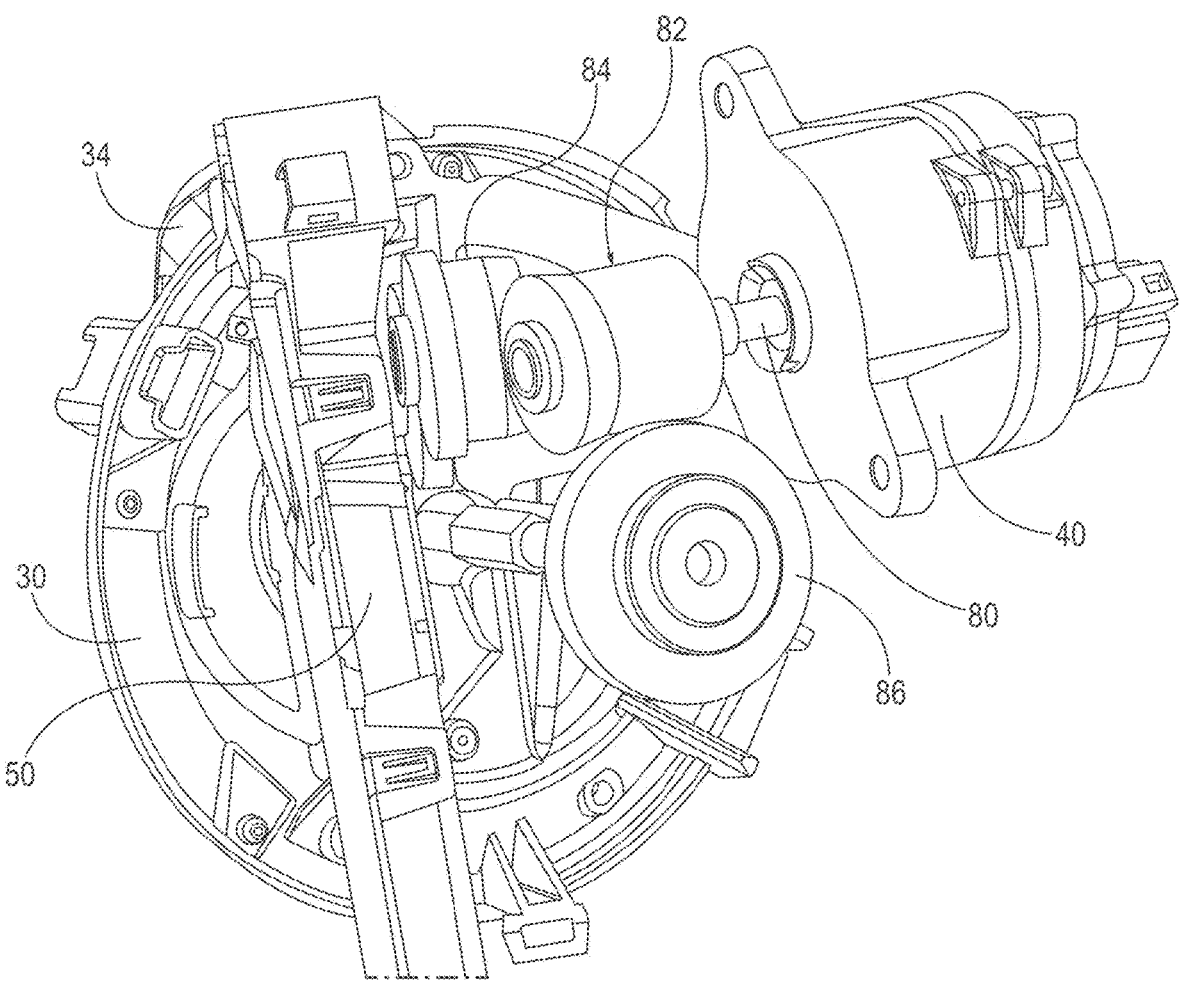
FIG. 7 is a front view of the assembly shown in FIG. 6.
Figure 8:
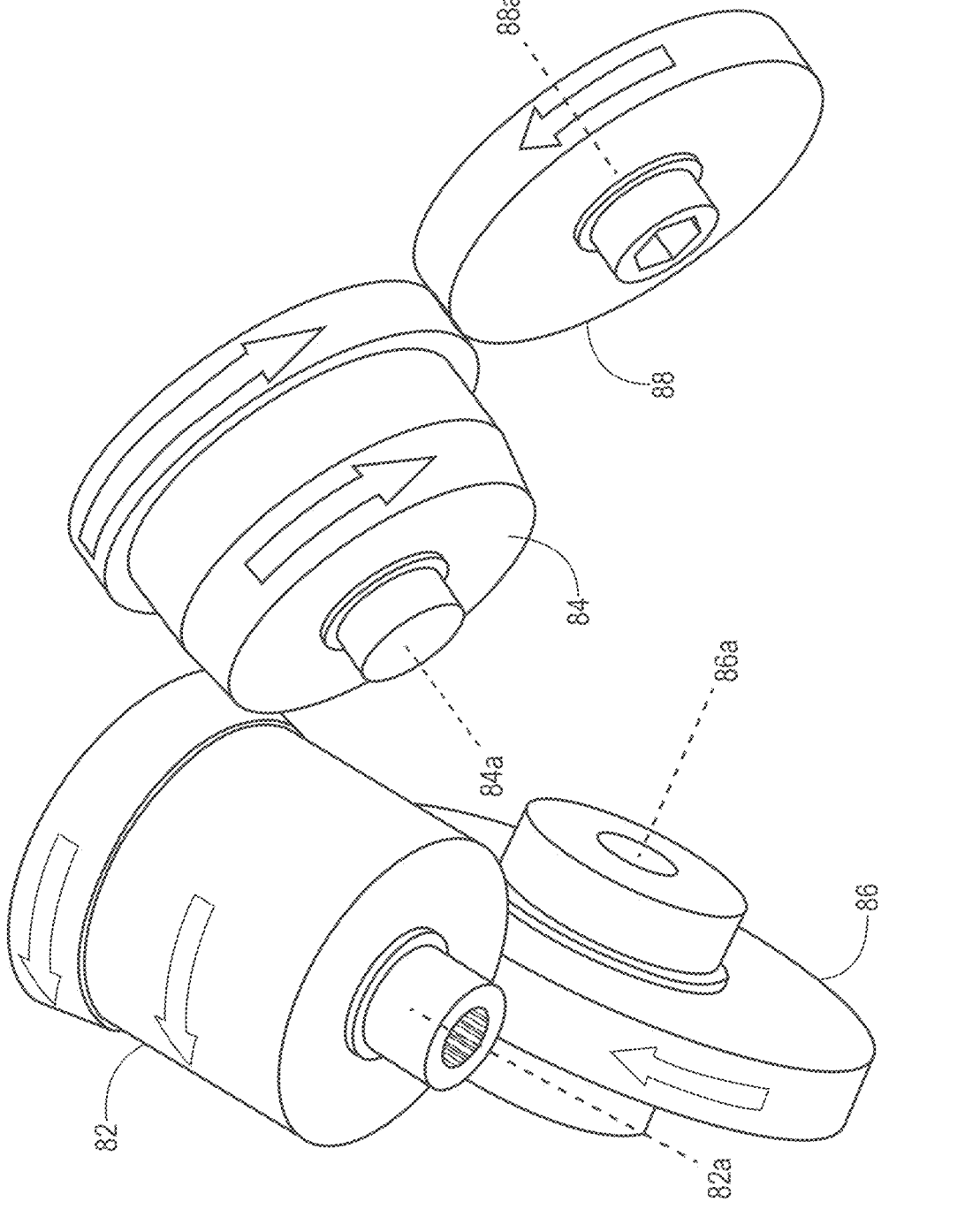
FIG. 8 is a perspective view of a drive train.

With reference to FIGS. 6-8, the drive member 40 causes rotation of both the metering member 44 and the endless member 50 via the gear train 42. Specifically, the drive member 40 rotates an output shaft 80, which directly rotates a first gear 82 about a first gear axis 82A. The first gear 82 engages a second gear 84 and rotates the second gear 84 about a second gear axis 84A that is at an angle, e.g., an acute angle, with respect to the first axis 82A. The angle between the first axis 82A and the second axis 84A depends upon the gear ratio and can vary in different configurations. The second gear 84 is connected to the metering member 44 to rotate the metering member 44 in response to rotation of the drive member 40. The first gear 82 is also connected to a third gear 86 to rotate the third gear 86 about a third axis third gear axis 86A. The third gear axis 86A can be approximately perpendicular to the first gear axis 82A. The third gear 86 engages a fourth gear 88 to rotate the fourth gear about a fourth gear axis 88A. The fourth gear axis 88A may be substantially parallel to the second gear axis 84A. The fourth gear 88 may be connected to one or more of the first pulley 52 and the second pulley 54 to rotate the endless member 50. In some embodiments, other gear train configurations are utilized.

In some embodiments, the first gear 82 and the fourth gear 88 are enlarged and the second gear 84 is omitted. The direction of rotation of the first gear 82 could be reversed in these embodiments to ensure that the fourth gear 88 rotates in the desired direction.

The drive member 40 may be a variable speed drive member that rotates the metering member 44 and the endless member 50 in cooperation with movement of the seeding machine 10. Rotation of the output shaft 80 of the drive member 40 can be proportional to the travel speed 60 of the machine 10. Therefore, as discussed above, the speed at which a seed 48 is discharged may be responsive to the speed of the seeding machine 10, e.g., the seeding machine travel vector 62. In some embodiments, while the seeding machine 10 travels at a first travel speed (e.g., a speed of a first seeding machine travel vector 62), the endless member 50 discharges seed at a first discharge speed (e.g., a speed of a first seed discharge velocity vector 72) and while the seeding machine 10 travels at a second travel speed (e.g., a speed of a second seeding machine travel vector 62), the endless member discharges seed at a second discharge speed (e.g., a speed of a second seed discharge velocity vector 72). The first discharge speed can be between 1.1 and 2 times the first travel speed and the second discharge speed can be between 1.1 and 2 times the second travel speed. In some embodiments, the first discharge speed is between 1.1 and 5 times the first travel speed and the second discharge speed is between 1.1 and 5 times the second travel speed. In some embodiments, the first discharge speed is between 1.1 and 10 times the first travel speed and the second discharge speed is between 1.1 and 10 times the second travel speed.

The endless member 50 may be configured to discharge seeds 48 into the furrow 70 at a first seed spacing while the machine travels at the first travel speed and discharge seeds 48 into the furrow 70 at a second seed spacing while the machine travels at the second travel speed. The first seed spacing is approximately equal to the second seed spacing.

The foregoing description and examples has been set forth merely to illustrate the disclosure and are not intended as being limiting. Each of the disclosed aspects and embodiments of the present disclosure may be considered individually or in combination with other aspects, embodiments, and variations of the disclosure. In addition, unless otherwise specified, none of the steps of the methods of the present disclosure are confined to any particular order of performance. Modifications of the disclosed embodiments incorporating the spirit and substance of the disclosure may occur to persons skilled in the art and such modifications are within the scope of the present disclosure. Furthermore, all references cited herein are incorporated by reference in their entirety.

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although systems and methods for metering and dispensing seeds from a seeding machine have been disclosed in the context of certain embodiments and examples, this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of systems and methods for metering and dispensing seeds from a seeding machine. The scope of this disclosure should not be limited by the particular disclosed embodiments described herein.

Certain features that are described in this disclosure in the context of separate implementations can be implemented in combination in a single implementation. Conversely, various features that are described in the context of a single implementation can be implemented in multiple implementations separately or in any suitable subcombination. Although features may be described herein as acting in certain combinations, one or more features from a claimed combination can, in some cases, be excised from the combination, and the combination may be claimed as any subcombination or variation of any subcombination.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various embodiments described and the appended claims. Further, the disclosure herein of any particular feature, aspect, method, property, characteristic, quality, attribute, element, or the like in connection with an embodiment can be used in all other embodiments set forth herein. Any methods disclosed herein need not be performed in the order recited. Depending on the embodiment, one or more acts, events, or functions of any of the algorithms, methods, or processes described herein can be performed in a different sequence, can be added, merged, or left out altogether (e.g., not all described acts or events are necessary for the practice of the algorithm). In some embodiments, acts or events can be performed concurrently, e.g., through multi-threaded processing, interrupt processing, or multiple processors or processor cores or on other parallel architectures, rather than sequentially. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some embodiments may be performed using the sequence of operations described herein, while other embodiments may be performed following a different sequence of operations.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described herein should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. Certain figures are drawn and/or shown to scale, but such scale should not be limiting, since dimensions and proportions other than what are shown are contemplated and are within the scope of the embodiments disclosed herein. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

The methods disclosed herein may include certain actions taken by a practitioner; however, the methods can also include any third-party instruction of those actions, either expressly or by implication. For example, actions such as "positioning an electrode" include "instructing positioning of an electrode."

The ranges disclosed herein include any value in between those values listed, including the endpoints, unless specifically stated to the contrary. Additionally, the ranges disclosed herein also encompass any and all overlap, subranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1 V" includes "1 V." Phrases preceded by a term such as "substantially" include the recited phrase and should be interpreted based on the circumstances (e.g., as much as reasonably possible under the circumstances). For example, "substantially perpendicular" includes "perpendicular." Unless stated otherwise, all measurements are at standard conditions including temperature and pressure.

In summary, various embodiments and examples of systems and methods for metering and dispensing seeds from a seeding machine have been disclosed. Although the systems and methods for metering and dispensing seeds from a seeding machine have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described herein, but should be determined only by a fair reading of the claims that follow.

What is claimed is:

1. A seed placement device configured to be connected to a seeding machine to transfer seed to a furrow, the seed placement device comprising:
   a housing having a first opening through which seed is received and a second opening through which seed is discharged;
   an endless member positioned within the housing;
   a drive member configured to control movement of the endless member in cooperation with movement of the seeding machine, wherein the seeding machine is operable in a seeding direction at a travel speed; and
   a seed capture device configured to retain seeds within the furrow, wherein the seed capture device comprises a press wheel, wherein the endless member is configured to discharge seed into a point where the seed capture device contacts a bottom of the furrow at a discharge speed and in a discharge direction, wherein the discharge direction is approximately opposite to the seeding direction, and wherein the discharge speed of the seed is between 1.1 and 10 times the travel speed of the machine.

2. The seed placement device of claim 1, wherein the drive member is a variable speed drive member.

3. The seed placement device of claim 1, further comprising a metering member including a plurality of apertures each sized to receive one or more seeds and to deliver the one or more seeds to the endless member in response to rotation of the metering member.

4. The seed placement device of claim 3, wherein the drive member is configured to rotate the metering member in cooperation with movement of the seeding machine.

5. The seed placement device of claim 4, wherein a speed of rotation of the drive member is proportional to the travel speed, and wherein the discharge speed is at least two times the travel speed.

6. The seed placement device of claim 4, wherein the endless member is configured to receive seeds from the metering member and discharge seeds into the furrow at the discharge speed, and wherein the discharge speed of the seed is between 1.1 and 5 times the travel speed of the machine.

7. The seed placement device of claim 1, wherein the discharge speed is a first discharge speed, and the travel speed is a first travel speed, wherein the seeding machine is operable in the seeding direction at a second travel speed, the second travel speed being different from the first travel speed, wherein the endless member is configured to discharge seed at a second discharge speed in the discharge direction while the machine travels at the second travel speed, and wherein the second discharge speed is between 1.1 and 10 times the second travel speed.

8. The seed placement device of claim 7, wherein the endless member is configured to discharge seeds into the furrow at a first seed spacing while the machine travels at the first travel speed and is configured to discharge seeds into the furrow at a second seed spacing while the machine travels at the second travel speed, and wherein the first seed spacing is approximately equal to the second seed spacing.

9. A seeding machine configured to move along a ground surface in a seeding direction at a seeing speed and to transfer seed to a furrow, the seeding machine comprising:
   a seed placement device connected to the machine for movement along the ground surface with the machine, the seed placement device including:
   a housing having a first opening through which seed is received and a second opening through which seed is discharged;
   an endless member positioned within the housing;
   a drive member configured to control movement of the endless member in cooperation with movement of the machine, wherein the endless member is configured to discharge seed in a discharge direction at a discharge speed, wherein the discharge direction is approximately opposite to the seeding direction, and wherein the discharge speed of the seed is between 1.1 and 10 times the seeding speed of the machine; and
   a seed capture device configured to retain seeds within the furrow, wherein the seed capture device comprises a press wheel, wherein the endless member is configured to discharge seeds into a point where the seed capture device contacts a bottom of the furrow.

10. The seeding machine of claim 9, wherein the drive member is a variable speed drive member.

11. The seeding machine of claim 9, further comprising a metering member positioned within the housing and configured to rotate, the metering member including a plurality of apertures each sized to receive one or more seeds and to deliver the one or more seeds to the endless member in response to rotation of the metering member.

12. The seeding machine of claim 11, wherein the drive member is configured to rotate the metering member in cooperation with movement of the machine.

13. The seeding machine of claim 12, wherein a speed of rotation of the drive member is proportional to the seeding speed, and wherein the discharge speed of the seed is at least two times the seeding speed of the machine.

14. The seeding machine of claim 13, wherein the endless member is configured to receive seeds from the metering member and discharge seeds into the furrow at the discharge speed, and wherein the discharge speed of the seed is between 1.1 and 5 times the travel speed of the machine.

15. The seeding machine of claim 9, wherein the discharge speed is a first discharge speed and the seeding speed is a first seeding speed, wherein the machine is operable in the seeding direction at a second seeding speed, wherein the endless member is configured to discharge seed in the discharge direction at a second discharge speed while the machine travels at the second seeding speed, and wherein the second discharge speed is at between 1.1 and 10 times the second seeding speed.

16. The seeding machine of claim 15, wherein the endless member is configured to discharge seeds into the furrow at a first seed spacing while the machine travels at the first seeding speed and is configured to discharge seeds into the furrow at a second seed spacing while the machine travels at the second seeding speed, and wherein the first seed spacing is approximately equal to the second seed spacing.

17. A seed placement device configured to be connected to a machine to transfer seed to a furrow, the seed placement device comprising:

a hopper configured to store and deliver seed;

a metering member including a plurality of apertures each sized to receive one or more seeds from the hopper and to dispense the one or more seeds;

an endless member positioned to receive the one or more seeds from the metering member and configured to discharge the one or more seeds into the furrow;

a variable speed drive member configured to control movement of the endless member in cooperation with movement of the machine, wherein the machine is operable in a seeding direction at a seeding speed, wherein the endless member is configured to discharge seed in a discharge direction at a discharge speed while the machine travels at the seeding speed, wherein the discharge direction is approximately opposite to the seeding direction, and wherein the discharge speed is between 1.1 and 10 times the seeding speed; and a seed capture device configured to retain seeds within the furrow, wherein the seed capture device comprises a press wheel, wherein the endless member is configured to discharge seeds into a point where the seed capture device contacts a bottom of the furrow.

18. The seed placement device of claim 17, wherein a speed of rotation of the drive member is proportional to the seeding speed, and wherein the discharge speed of the seed is at least two times the seeding speed of the machine.

19. The seed placement device of claim 17, wherein the discharge speed is a first discharge speed and the seeding speed is a first seeding speed, wherein the machine is operable in the seeding direction at a second seeding speed, wherein the endless member is configured to discharge seed at a second discharge speed in the discharge direction, and wherein the second discharge speed is between 1.1 and 10 times the second seeding speed.

20. The seed placement device of claim 19, wherein the endless member is configured to discharge seeds into the furrow at a first seed spacing while the machine travels at the first seeding speed and is configured to discharge seeds into the furrow at a second seed spacing while the machine travels at the second seeding speed, and wherein the first seed spacing is substantially equal to the second seed spacing.

* * * * *